United States Patent [19]
Rizzi et al.

[11] Patent Number: 5,464,247
[45] Date of Patent: Nov. 7, 1995

[54] APPARATUS FOR USE IN INFLATING AN AIR BAG AND METHOD OF ASSEMBLY

[75] Inventors: Douglas J. Rizzi, Eastpointe; Pondget P. Wipasuramonton, Rochester; Paul T. Saccone, Rochester Hills, all of Mich.

[73] Assignee: TRW Vehicle Safety Systems Inc., Lyndhurst, Ohio

[21] Appl. No.: 314,584

[22] Filed: Sep. 28, 1994

[51] Int. Cl.⁶ ................................................ B60R 21/26
[52] U.S. Cl. .................... 280/737; 280/741; 228/140
[58] Field of Search .............................. 280/728 R, 741, 280/737, 738, 739, 736, 732; 215/267, 263; 220/359; 277/235 A, 227; 228/140, 184

[56] References Cited

U.S. PATENT DOCUMENTS

| | | | |
|---|---|---|---|
| Re. 28,164 | 9/1974 | Stephenson | 280/737 |
| 1,005,996 | 10/1911 | Miles | 215/263 |
| 2,725,252 | 11/1955 | Greer | 220/319 |
| 3,788,667 | 1/1974 | Vancil | 280/737 |
| 3,966,226 | 6/1976 | Roth | 280/737 |
| 4,114,924 | 9/1978 | Kasagi | 280/740 |
| 5,087,070 | 2/1992 | O'Loughlin | 280/740 |
| 5,280,951 | 1/1994 | Rizzi et al. | 280/736 |
| 5,320,238 | 6/1994 | Verdesca | 220/319 |

FOREIGN PATENT DOCUMENTS 2921552 12/1979 Germany ................................ 280/741

*Primary Examiner*—Karin L. Tyson
*Attorney, Agent, or Firm*—Tarolli, Sundheim & Covell

[57] ABSTRACT

An apparatus for use in inflating an air bag comprises a container (15) containing a supply of inflation fluid. The container has a first outer surface (19) and an inner surface (26) which is threaded and defines a threaded opening extending into the container from the first outer surface. A plug (40) has an outer periphery (45) which is threaded. The plug is screwed into the threaded opening in the container. The outer periphery of the plug includes a second outer surface (51) adjacent the first outer surface of the container. The outer periphery of the plug and the inner surface of the container that defines the threaded opening comprise an interface (11) between the plug and the container. The interface extends to the periphery of the container between the first and second outer surfaces. A ring (30) overlies both the interface and portions of the first and second outer surfaces. The ring is secured to the first and second outer surfaces to block leakage of inflation fluid from the container through the interface.

21 Claims, 4 Drawing Sheets

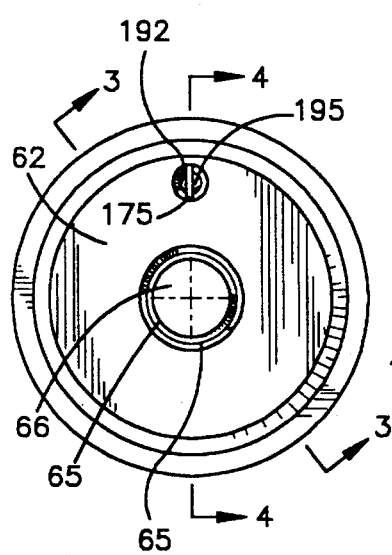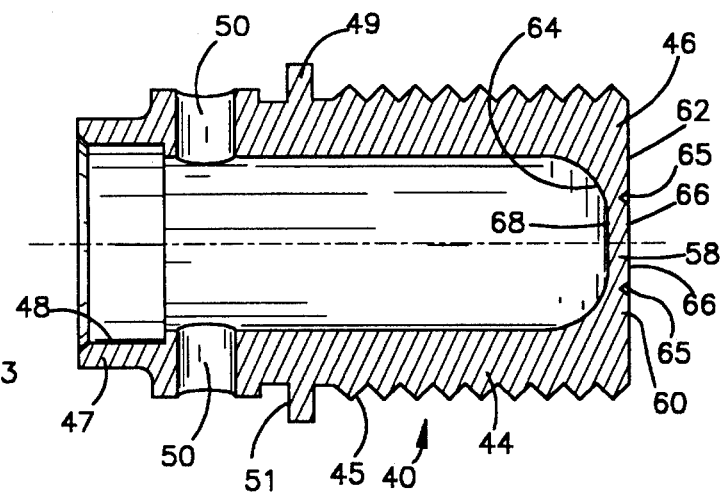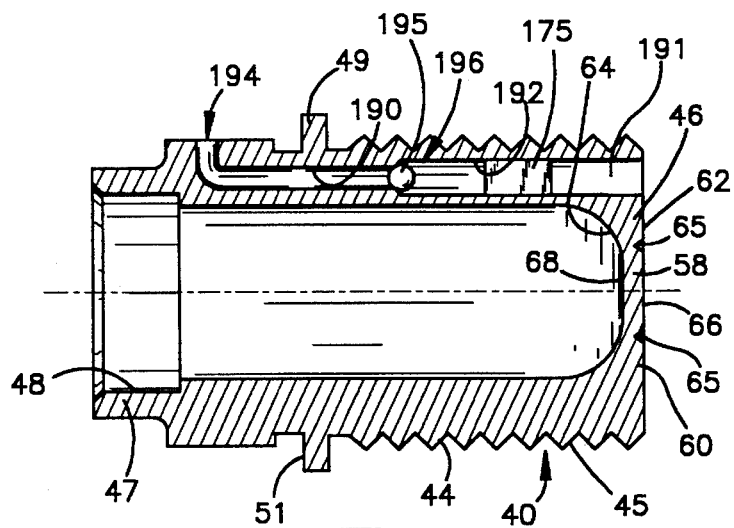

APPARATUS FOR USE IN INFLATING AN AIR BAG AND METHOD OF ASSEMBLY

TECHNICAL FIELD

The present invention relates to an apparatus for use in inflating a vehicle occupant restraint, such as an air bag, and to a method of making the apparatus.

BACKGROUND ART

A known apparatus for use in inflating a vehicle occupant restraint, such as an air bag, includes a container containing inflation fluid under pressure. A body of ignitable material is disposed within the container. An igniter assembly is actuatable to ignite the body of ignitable material. As the ignitable material burns, it heats the inflation fluid in the container to increase the fluid pressure in the container.

Typically, the container defines a generally cylindrical cheer. The chamber is filled with inflation fluid under pressure which is introduced into the chamber through a passage. Once the chamber has been filled with inflation fluid at a desired pressure, the passage is closed. The container includes a burst disk which is ruptured in response to vehicle deceleration of a magnitude indicating the occurrence of a collision. When the burst disk is ruptured, it defines an outlet opening through which the inflation fluid flows from the chamber of the container toward the air bag to inflate the air bag.

SUMMARY OF THE INVENTION

In accordance with one aspect of the present invention, an apparatus is provided for use in inflating an air bag. The apparatus comprises a container containing a supply of inflation fluid. The container has a first outer surface and an inner surface which is at least in part threaded and defines a threaded opening extending into the container from the first outer surface. A plug has an outer periphery which is at least in part threaded. The plug is screwed into the threaded opening in the container. The outer periphery of the plug includes a second outer surface adjacent the first outer surface of the container. The outer periphery of the plug and the inner surface of the container that defines the opening comprise an interface between the plug and the container. The interface extends to the periphery of the container between the first and second outer surfaces. Means is provided for blocking leakage of inflation fluid from the container through the interface. The blocking means includes (i) a ring overlying the interface and overlying portions of the first and second outer surfaces and (ii) means securing the ring to the first and second outer surfaces.

In accordance with another aspect of the present invention, a method of manufacturing an apparatus for use in inflating an air bag comprises the step of providing a container having a first outer surface and an internally threaded opening extending into the container from the first outer surface. The method also comprises the step of screwing a plug having an outer periphery which is at least in part threaded into the internally threaded opening in the container. The outer periphery of the plug includes a second outer surface adjacent to the first outer surface of the container. The screwing of the plug into the internally threaded opening in the container creates an interface between the plug and the container. The interface extends to the periphery of the container between the first and second outer surfaces. The method further comprises the steps of positioning a ring so as to overlie the interface and portions of the first and second outer surfaces, and securing the ring to the first and second outer surfaces to block leakage of inflation fluid from the container through the interface.

BRIEF DESCRIPTION OF THE DRAWINGS

The foregoing and other objects and features of the present invention will become more apparent to one skilled in the art to which the present invention relates upon consideration of the following description of the invention with reference to the accompanying drawings, in which:

FIG. 2 is a full end view of a plug used in the inflator assembly of FIG. 1;

FIG. 3 is a sectional view taken approximately along line 3—3 in FIG. 2;

FIG. 4 is a sectional view taken approximately along line 4—4 in FIG. 2;

DESCRIPTION OF PREFERRED EMBODIMENT

Figure 1:
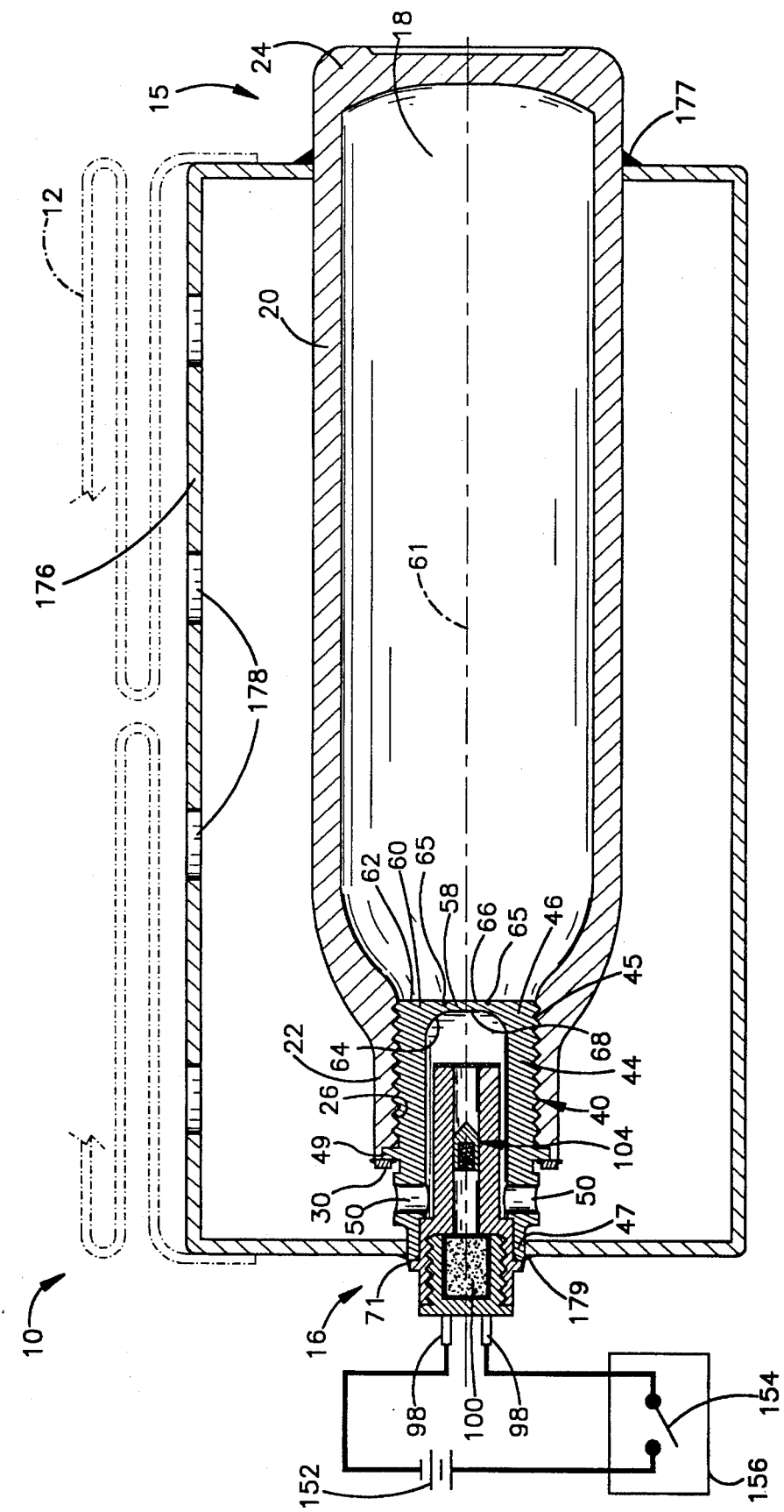
FIG. 1 is a sectional view of an inflator assembly which is constructed and assembled in accordance with the present invention.
Figure 5:
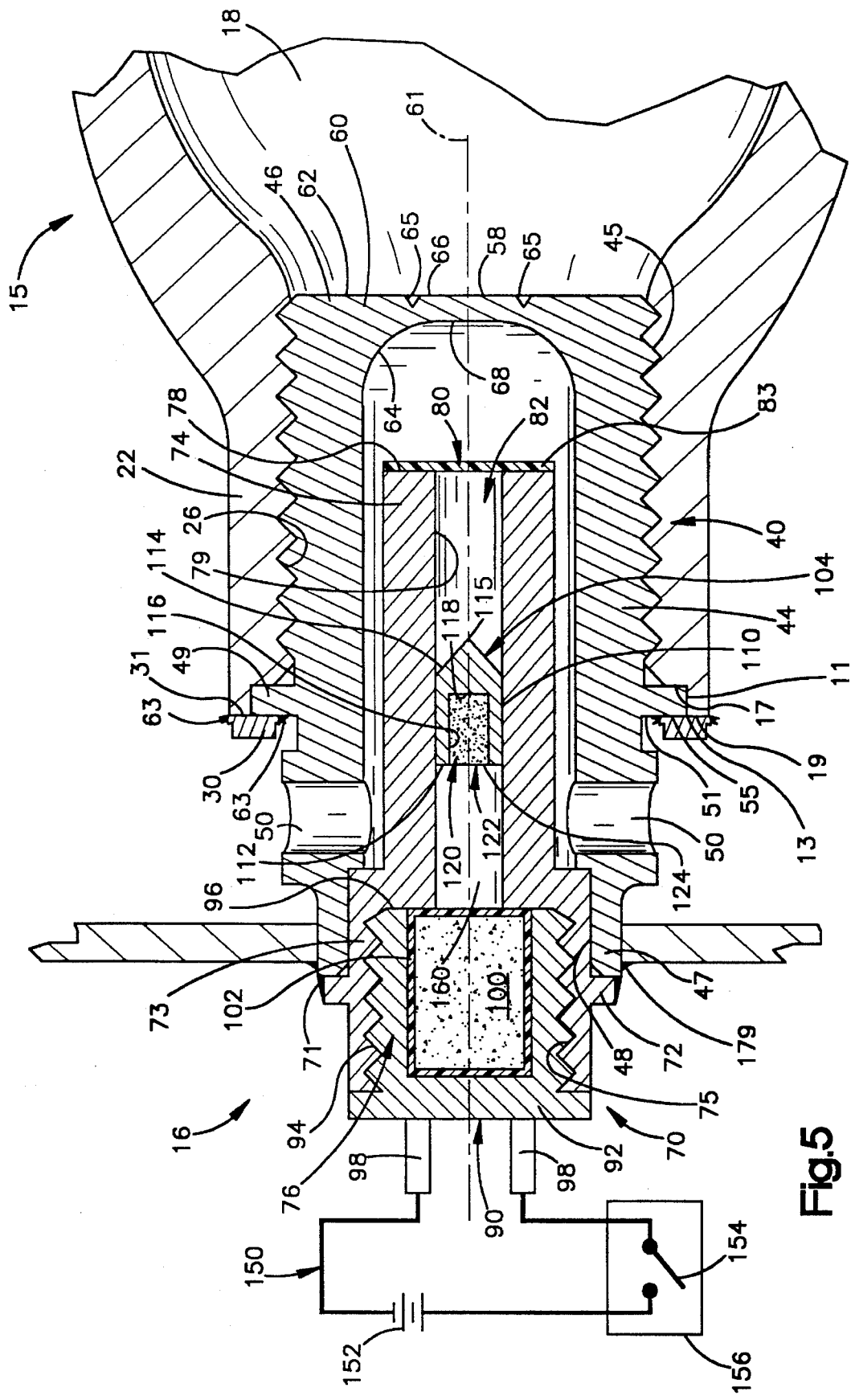
FIG. 5 is an enlarged view of a portion of FIG. 1 and showing the inflator assembly in an unactuated condition.
Figure 6:
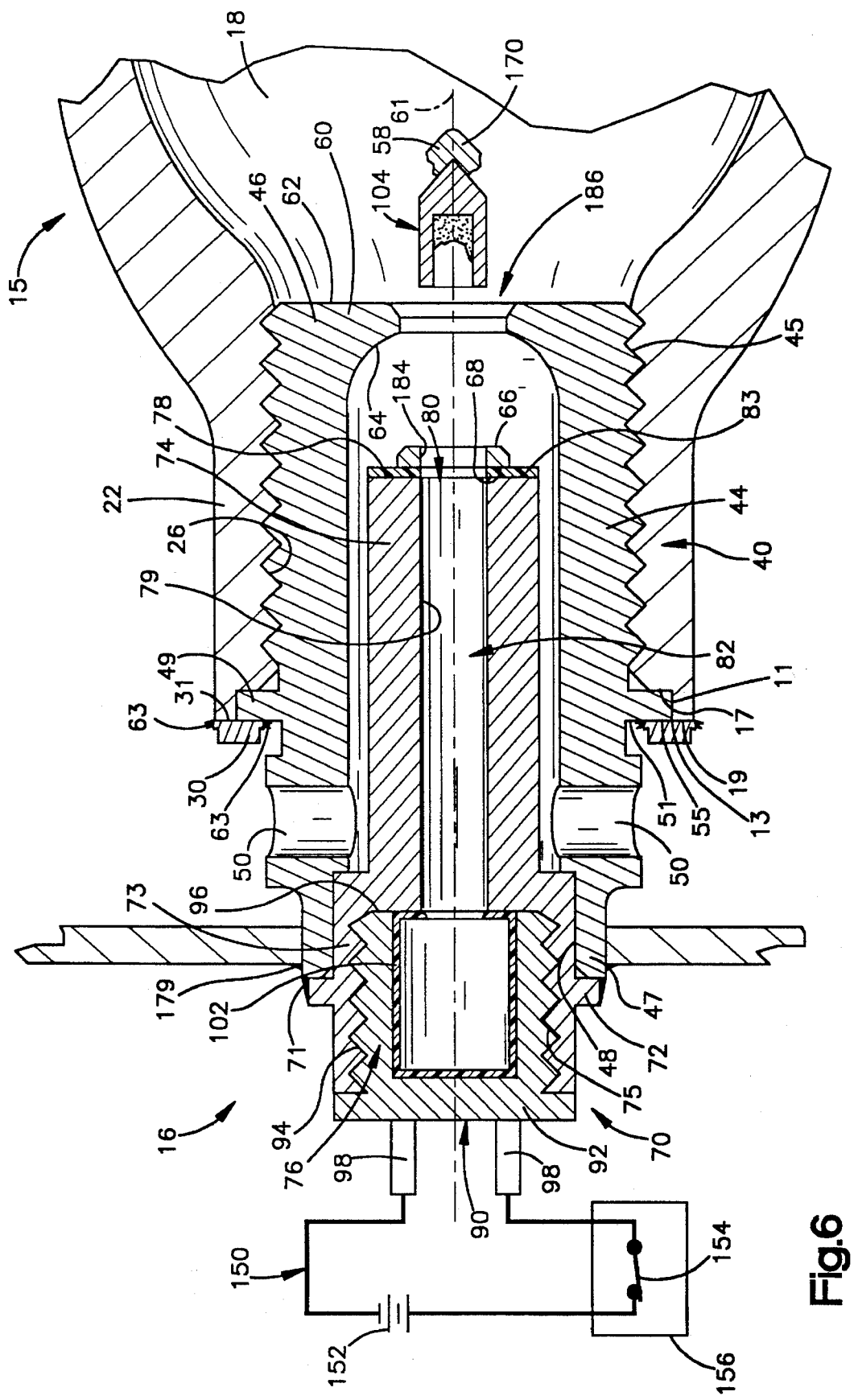
FIG. 6 is a view similar to FIG. 5 but showing the inflator assembly in an actuated condition.

An inflator assembly 10 constructed in accordance with the present invention is shown schematically in FIG. 1. The inflator assembly 10 provides inflation fluid for inflating an inflatable vehicle occupant restraint which, in the preferred embodiment of the invention shown in the drawings, is an air bag 12. The inflator assembly 10 has an unactuated condition, as shown in FIGS. 1 and 5, in which the air bag 12 is in a stored, folded condition. The inflator assembly 10 also has an actuated condition, as shown in FIG. 6, in which the air bag 12 is in an inflated condition. The inflator assembly 10 is actuated in response to vehicle deceleration of at least a predetermined magnitude which indicates the occurrence of a vehicle collision. The air bag 12 is then inflated from the stored, folded condition to the inflated condition in which it restrains movement of a vehicle occupant and protects the occupant from forcibly striking parts of the vehicle.

The inflator assembly 10 comprises a container member 15 and an actuator assembly 16. The container member 15 defines a vessel having a chamber for holding pressurized inflation fluid. Preferably, the container member 15 is made of 6061-T6 aluminum material.

The container member 15 and the actuator assembly 16 together define a sealed storage chamber 18 for containing inflation fluid, such as gas, for inflating the air bag 12. The actuator assembly 16 opens the sealed storage chamber 18 to release the inflation fluid from the storage chamber 18 upon the occurrence of vehicle deceleration of at least the predetermined magnitude which indicates the occurrence of a vehicle collision.

The container member 15 has a cylindrical side wall portion 20, a neck wall portion 22, and an end wall portion 24. The cylindrical side wall portion 20 is centered on and encircles an axis 61. The neck wall portion 22 of the container member 15 has an inner surface 26 of which at least a part is threaded. The inner surface 26 defines an opening at the neck wall portion 22. The neck wall portion 22 of the container member 15 also has a first annular surface 17 (FIG. 5) which extends radially outward relative to the axis 61 and transverse to the inner surface 26, and a second annular surface 19 (FIG. 5) which extends parallel to and is spaced apart from the first annular surface 17 along the axis 61.

The inflation fluid in the storage chamber 18 preferably comprises a combustible mixture of gases. The combustible mixture of gases in the storage chamber 18 includes a primary gas which comprises the majority of the gas for inflating the air bag 12, and a combustible gas which, when ignited, heats the primary gas. The mixture of gases is in a homogeneous gaseous state. The primary gas preferably includes an oxidizer gas for supporting combustion of the combustible gas, and an inert gas for inflating the air bag 12. The primary gas may include air or a mixture of air and an inert gas. The inert gas may be nitrogen, argon, or a mixture of nitrogen and argon.

Preferably, the primary gas is air and the oxidizer gas is the oxygen in the air. The combustible gas may be hydrogen, methane, or a mixture of hydrogen and methane. Preferably, the combustible gas is hydrogen. A typical composition of the mixture of gases is about 12% by volume hydrogen and 88% by volume air. The mixture of gases is stored in the storage chamber 18 at a pressure of approximately 2,500 psi, but could be stored in the storage chamber 18 at a different pressure.

Referring to FIGS. 1–5, the actuator assembly 16 includes a plug member 40 which is made of, preferably, 6061-T6 aluminum material. The plug member 40 has a tubular side wall portion 44 centered on and encircling the axis 61. A circular closure wall portion 46 extends transversely of the axis 61 at one end of the side wall portion 44. A tubular lip portion 47 projects axially from the other end of the side wall portion 44. The side wall portion 44 and closure wall portion 46 define a chamber in the plug member 40. The lip portion 47 of the plug member 40 has an annular inner surface 48 (FIG. 3) which defines a central passage through the lip portion 47 which communicates with the chamber in the plug member 40 and the exterior of the plug member 40. A plurality of gas flow openings 50 (FIGS. 1, 3, and 5) extend radially through the side wall portion 44 of the plug member 40 and communicate with the chamber in the plug member 40.

The closure wall portion 46 of the plug member 40 includes a predefined central break away portion 58 and an annular rim portion 60, both of which are centered on the axis 61. As best shown in FIG. 5, the rim portion 60 has an outer side surface 62 and an inner side surface 64. An annular V-shaped groove 65 circumscribes the break away portion 58. The break away portion 58 has an outer side surface 66 and an inner side surface 68. The groove 65 is defined by surfaces which converge and provides a stress riser in the material of the closure wall portion 46 which interconnects the break away portion 58 with the rim portion 60. The juncture of the groove 65 thus defines a ring-shaped boundary at which the break away portion 58 of the closure wall portion 46 may break away from the rim portion 60.

As best shown in FIGS. 3 and 4, the side wall portion 44 of the plug member 40 includes an annular outer threaded surface 45 that extends from the closure wall portion 46 toward the lip portion 47. At the end of the threaded surface 45 farthest from the closure wall portion 46, an annular flange portion 49 projects radially away from the outer periphery of the side wall portion 44. The threaded surface 45 on the side wall portion 44 of the plug member 40 engages the threaded part of the inner surface 26 on the neck wall portion 22 of the container member 15 when the plug member 40 is screwed into the container member 15. The flange portion 49 has an annular radially extending surface 51 which aligns flush with the second annular surface 19 on the neck wall portion 22 of the container member 15 when the plug member 40 is fully screwed into the container member 15, as shown in FIGS. 1 and 5.

When the plug member 40 and the container member 15 are assembled together, an interface 11 between the plug member 40 and the container member 15 is defined by the abutting surfaces of the plug member 40 and the container member 15. The abutting surfaces include the threaded surface 45 of the plug member 40 and the threaded part of the inner surface 26 of the container member 15. The interface 11 extends to the periphery of the plug member 40 and the container member 15 at the junction of the surface 51 and the second annular surface 19, which is designated as location 13 in FIG. 5.

As best shown in FIG. 5, a weld ring 30 is located adjacent the annular surface 51 on the flange portion 49 of the plug member 40 and the second annular surface 19 on the neck wall portion 22 of the container member 15. The weld ring 30 is, preferably, made of 6061-T6 aluminum material. The weld ring 30 overlies the interface 11 at location 13 where it extends to the periphery of the plug member 40 and the container member 15. The weld ring 30 also overlies the annular end surface 51 of the plug member 40 and the second annular surface 19 of the container member 15. The weld ring 30 is friction welded to the annular end surface 51 and the second annular surface 19 to provide a hermetic seal between the container member 15 and the plug member 40.

To friction weld the weld ring 30 to the container member 15 and plug member 40, the weld ring 30 is mounted on a spindle (not shown) and secured to the spindle using a collet (also not shown). The spindle is rotated at a speed of about 6,000 revolutions per minute and moved in a direction along the axis 61 to move a flat annular surface 31 of the weld ring 30 into engagement with the annular end surface 51 and the second annular surface 19. The amount of pressure with which the surface 31 on the weld ring 30 is pressed against the surfaces 19, 51 will depend upon the actual area of the surface 31 on the particular weld ring 30.

When the surface 31 on the weld ring 30 engages the surfaces 19, 51, the material of the surface 31, the material of the surface 19 and the material of the surface 51 heat up to a plastic state. The heated material of the surface 19 and the heated material of the surface 51 flow into the material of the surface 31 and into each other to form a weld band 55. At the same time the weld band 55 is being formed, a curly flash 63 is formed around the periphery of the weld band 55, as shown somewhat exaggerated in FIG. 5.

After the weld band 55 and the curly flash 63 are formed, the spindle is moved away from weld ring 30. The weld band 55 and the curly flash 63 are allowed to cool to provide a weld joint which secures the weld ring 30, the container member 15, and the plug member 40 together. The weld joint forms a continuous ring around the periphery of the plug member 40 and provides a hermetic seal between the plug member 40 and the container member 15.

Referring to FIGS. 2 and 4, the plug member 40 has first and second internal passages 190, 192 which extend through the side wall portion 44 of the plug member 40 generally parallel to the axis 61. The second internal passage 192 is coaxial with, but has a diameter which is larger than the diameter of, the first internal passage 190. The second internal passage 192 communicates with the storage chamber 18. The first internal passage 190 communicates with a fill hole 194 that opens radially outward and communicates with the exterior of the plug member 40.

A ball check valve assembly 196 having a ball 195 is disposed in the second internal passage 192 at the end of the second internal passage 192 adjacent the first internal passage 190, as shown in FIG. 4. The ball check valve assembly 196 further includes a blade member 175 disposed in the central region of the second internal passage 192. The blade member 175 is press fit into the second internal passage 192 and engages an inner circumferential surface 191 of the plug 40 which defines the second internal passage 192.

After the weld joint is formed and the weld ring 30, the container member 15, and the plug member 40 are secured together, a source of pressurized inflation fluid (not shown) is connected at the fill hole 194 and pressurized inflation fluid is introduced through the fill hole 194 into the first internal passage 190. The pressure of the pressurized inflation fluid in the first internal passage 190 causes the ball 195 of the ball check valve assembly 196 to move from its position adjacent the first internal passage 190 toward the right, as viewed in FIG. 4. The ball 195 continues to move toward the right until it engages the blade member 175. As the ball 195 moves away from the position adjacent the first internal passage 190, the pressurized inflation fluid in the first internal passage 190 flows through the second internal passage 192 around the ball 195 and past the blade member 175 into the chamber 18.

After the chamber 18 is filled with pressurized inflation fluid, the source of pressurized inflation fluid is removed from the fill hole 194. The pressure of the inflation fluid in the chamber 18 causes the ball 195 of the ball check valve assembly 196 to move back toward the left, as viewed in FIG. 4. The ball 195 continues moving to the left until it sealingly engages a tapered circumferential surface between the first and second internal passages 190, 192.

The pressure of the inflation fluid in the chamber 18 and, therefore, in the second internal passage 192 is sufficient to maintain the ball 195 in sealing engagement with the tapered circumferential surface between the first and second internal passages 190, 192. The pressurized inflation fluid in the chamber 18 is thereby prevented from flowing back through the first and second passages 190, 192 and out through the fill hole 194. The fill hole 194 is then sealed by friction welding a closure member to a flat surface of the plug member 40 which encircles the fill hole 194.

When the storage chamber 18 is filled with a mixture of gases as described above, the pressure of the stored mixture of gases acts axially outward against the outer side surface 66 of the break away portion 58 of the closure wall portion 46. The ambient air pressure simultaneously acts axially inward against the inner side surface 68 of the break away portion 58. As a result, the break away portion 58 is subjected to a gas pressure differential between the pressure of the stored mixture of gases and the ambient air pressure. Since the pressure of the stored mixture of gases is higher than the ambient air pressure, the gas pressure differential results in a pressure force urging the break away portion 58 to move axially outward. The material of the closure wall portion 46 which comprises the stress riser interconnecting the break away portion 58 with the rim portion 60 is designed to rupture under the stress induced by a pressure force acting axially outward when the pressure force reaches a predetermined elevated level.

After the chamber 18 is filled with inflation fluid, an actuator housing 70 is placed into the plug member 40 such that the actuator housing 70 is supported in the plug member 40. The actuator housing 70 is a tubular member centered on the axis 61. As shown in FIGS. 1 and 5, the actuator housing 70 is closely received through the opening defined by the projecting lip portion 47 of the plug member 40. A weld 71 blocks leakage of gas between the projecting lip portion 47 of the plug member 40 and a flange 72 on the actuator housing 70.

The actuator housing 70 has a base portion 73 and a guide portion 74. The base portion 73 includes the flange 72, and has a threaded inner surface 75 which defines a cylindrical base compartment 76. The guide portion 74 has an annular end surface 78 and a smooth cylindrical inner surface 79. The annular end surface 78 defines a circular opening 80. The cylindrical inner surface 79 defines a guide passage 82 extending axially through the guide portion 74 from the base compartment 76 to the opening 80. A suitable piece of tape 83 is adhesively connected to the annular end surface 78 to cover and seal the opening 80.

As further shown in FIG. 5, a squib 90 is supported within the actuator housing 70. The squib 90 has a cylindrical casing 92. The casing 92 has a threaded outer surface 94, and has an annular front end surface 96 defining an opening at the front end of the squib 90. A pair of electrically conductive pins 98 extend into the casing 92. The casing 92 contains a pyrotechnic charge 100 in an envelope 102 which is hermetically sealed. The pyrotechnic charge 100 is ignited upon the passage of electric current through the squib 90 between the pins 98. The pyrotechnic charge 100 is preferably $ZrKClO_4$, but other known pyrotechnic charge materials can be used in the squib 90. When the pyrotechnic charge 100 in the squib 90 is ignited, it produces combustion products which rupture the envelope 102 to open the hermetic seal and emerge through the opening at the front end surface 96 of the squib 90.

The casing 92 is screwed into the base compartment 76 of the actuator housing 70 with the opening at the front end surface 96 facing the guide passage 82. The threaded surfaces 75, 94 are engaged with each other closely and tightly enough to block leakage of gas between the threaded surfaces 75, 94. Alternatively, a weld or other seal could be provided for sealing and holding the squib 90 in place. The squib 90 is thus supported by the actuator housing 70 in a position to direct the combustion products from the pyrotechnic charge 100 into the guide passage 82 in a direction extending along the axis 61.

Also, as shown in FIG. 5, the actuator assembly 16 further includes a movable container 104 in the form of a projectile member. The movable container 104 has a cylindrical outer side surface 110, an annular rear end surface 112, and a conical front end surface 114. In the preferred embodiment of the invention shown in the drawings, the cylindrical outer side surface 110 of the movable container 104 has a diameter of 0.15 in. The conical front end surface 114 extends away from the cylindrical outer side surface 110 to form a pointed tip portion 115 of the movable container 104.

The movable container 104 further has a cylindrical inner surface 116 and a circular inner surface 118. The inner surfaces 116 and 118 are coaxial with the outer side surface 110, and together define a compartment 120 within the movable container 104. The compartment 120 has a cylindrical shape, with an open end at the annular rear end surface 112 and a closed end at the circular inner surface 118.

An ignitable material 122 is contained within the compartment 120 in the movable container 104. The ignitable material 122 is preferably $BKNO_3$, but, as with the pyrotechnic charge 100, other materials can be used as alternatives. In the preferred embodiment of the invention shown in the drawings, the ignitable material 122 fills the compartment 120 and has a surface 124 extending across the open end of the compartment 120. The ignitable material 122 (like the ignitable material 100) preferably is protected from environmental conditions such as moisture. Such protection could be accomplished by a cap or a cover in the nature of a shell or possibly a wax coating (none of which are shown in the drawings) which covers the surface 124 at the open end of the compartment 120.

When the inflator assembly 10 is in the unactuated condition shown in FIGS. 1 and 5, the movable container 104 is located within the actuator housing 70. Specifically, the movable container 104 has an unactuated position in which it is closely received coaxially within the guide passage 82 in the guide portion 74 of the actuator housing 70. When the movable container 104 is located in its unactuated position, the cylindrical outer side surface 110 of the movable container 104 is closely received against the cylindrical inner surface 79 of the guide portion 74 with a releasable interference fit. The interference fit can be supplemented with a crimp in the guide portion 74 of the actuator housing 70, or with a shear pin or the like. Additionally, the surface 124 of the ignitable material 122 faces axially toward the opening at the front end surface 96 of the squib 90.

The actuator assembly 16 further includes an electrical circuit 150. The electrical circuit 150 includes a power source 152, which is preferably the vehicle battery and/or a capacitor, and a normally open switch 154. The switch 154 is preferably part of a vehicle deceleration sensor 156. The deceleration sensor 156 senses vehicle deceleration of at least a predetermined magnitude which is indicative of a collision, and closes the switch 154 in response to such vehicle deceleration. Such a deceleration sensor is known in the art. The electrical circuit 150 extends through the squib 90 between the pins 98, and actuates the squib 90 when the switch 154 closes.

When the vehicle experiences deceleration of at least the predetermined magnitude indicative of a collision, the deceleration sensor 156 senses the occurrence of such vehicle deceleration and closes the switch 154. When the switch 154 closes, electric current passes through the squib 90 between the pins 98. The pyrotechnic charge 100 in the squib 90 is then ignited, and produces combustion products which rupture the envelope 102 and emerge from the squib 90. The combustion products emerging from the squib 90 move into a space 160 (FIG. 5) in the guide passage 82 between the squib 90 and the movable container 104, and move axially across the space 160 to the movable container 104. When the combustion products from the squib 90 reach the movable container 104, they ignite the ignitable material 122 in the compartment 120 at the surface 124. The ignitable material 122 then produces combustion products which are emitted from the open end of the compartment 120 and directed into the space 160. Any environmental protection over the surface 124 is destroyed.

When the pyrotechnic charge 100 and the ignitable material 122 are burning, the combustion products are initially contained in the space 160 between the squib 90 and the movable container 104. The gaseous components of the combustion products in the space 160 increase in pressure as the pyrotechnic charge 100 and the ignitable material 122 burn. The squib 90 is securely held in the base compartment 76 by the engaged threads. However, the movable container 104 is releasably held in the guide passage 82 by the interference fit.

When the increasing gas pressure in the space 160 reaches a predetermined elevated level, the force of the gas pressure acting axially against the movable container 104 becomes great enough to overcome the interference fit. The force of the gas pressure then propels the movable container 104 outward of the guide passage 82 from its unactuated position toward the opening 80 at a high velocity. The movable container 104 comprises a mass having an amount of kinetic energy when the movable container 104 is propelled at the high velocity. The kinetic energy of the movable container 104 is sufficient to enable the movable container 104 to break through the tape 83 and move outward through the opening 80 toward the closure wall portion 46.

The kinetic energy of the movable container 104 is further sufficient to enable the movable container 104 to penetrate and sever a part 170 (FIG. 6) of the break away portion 58 of the closure wall portion 46 so as to form a first hole 184 through the break away portion 58. Most preferably, the kinetic energy of the movable container 104 is great enough for the movable container 104 to shear the part 170 from the break away portion 58 so as to puncture the first hole 184 in a circular shape with a diameter substantially equal to the diameter of the cylindrical outer surface 110 of the movable container 104.

The first hole 184 is a first orifice through which the mixture of gases in the storage chamber 18 exits the storage chamber 18. The flow area of the first orifice 184 has a predetermined value substantially equal to the cross sectional area of the movable container 104, which in the preferred embodiment of the invention is 0.018 sq. in. The mixture of gases is ignited by the hot products of combustion produced by the actuator assembly 16, combusts, and flows outward through the first orifice 184 and further through the plug member 40 to the gas flow openings 50. A diffuser 176 (FIG. 1) with a plurality of gas exit openings 178 then directs the gas to flow from the gas flow openings 50 to the air bag 12. A weld 179 between the diffuser 176 and the plug member 40 blocks leakage of the gas flowing through the diffuser 176. Another weld 177 between the diffuser 176 and the container member 15 also blocks leakage of the gas flowing through the diffuser 176.

After the movable container 104 punctures the first orifice 184 through the break away portion 58 of the closure wall portion 46, the movable container 104 continues to move to the right, as viewed in the drawings, into the storage chamber 18. The movable container 104 thus carries the ignitable material 122, as well as the severed part 170 of the break away portion 58, into the mixture of gases in the storage chamber 18 when the ignitable material 122 is burning. The combustion products generated by the ignitable material 122 include heat, hot particles and hot gases. Those combustion products continue to be emitted from the compartment 120 in the movable container 104 as the movable container 104 moves through the mixture of gases. The combustion products are thus dispersed in the mixture of gases sufficiently to further ignite the combustible gas in the mixture rapidly throughout the storage chamber 18.

The movable container 104 is preferably propelled through the storage chamber 18 along the axis 61 from the closure wall portion 46 nearly to the bottom wall portion 24 of the container member 15. The ignitable material 122 preferably continues to spew combustion products into the mixture of gases until the movable container 104 reaches the far end of the storage chamber 18. An optional screen (not shown) may be included inside the storage chamber 18 adjacent the bottom wall portion 24 of the container member 15. The screen would be punctured by the movable container 104, and would capture the movable container 104 at the far end of the storage chamber 18. The screen would also capture the severed part 170 of the break away portion 58 of the closure wall portion 46 which is carried by the movable container 104.

When the combustible gas burns during its exit from or in the storage chamber 18, it generates heat and gaseous products of combustion which increase the temperature and pressure of the mixture of gases. For example, in a test apparatus including a pressure vessel with a storage chamber like the storage chamber 18, the pressure of the mixture of gases was increased from an initial storage pressure of approximately 2,000–2,500 psi to an elevated pressure of approximately 4,500–5,500 psi.

Although the mixture of gases is already beginning to combust and flow outward from the storage chamber 18 through the first orifice 184 while the pressure is being increased inside the storage chamber 18, the break away portion 58 of the closure wall portion 46 continues to be subjected to a gas pressure differential between the side surfaces 66 and 68. Accordingly, the gas pressure differential across the break away portion 58 increases with the increasing pressure inside the storage chamber 18. When the gas pressure differential reaches a predetermined elevated level, the resulting pressure force acting axially outward against the break away portion 58 reaches a corresponding predetermined elevated level. The material of the closure wall portion 46 which comprises the stress riser interconnecting the break away portion 58 with the rim portion 60, as described above, then ruptures under the stress induced by the pressure force.

When the material of the closure wall portion 46 ruptures, the break away portion 58 is released for movement axially outward from the closure wall portion 46 and into the plug member 40 under the influence of the gas flowing outward from the storage chamber 18. A second hole 186 through the closure wall portion 46 is thus formed, as shown in FIG. 6. The second hole 186 has a circular shape and diameter matching the circular shape and diameter of the periphery of the break away portion 58.

The second hole 186 is a second orifice through which gas exits the storage chamber 18. Since the second orifice 186 is substantially larger than the first orifice 184, the flow rate outward through the second orifice 186 is substantially greater than the flow rate at which the gas previously flowed outward through the first orifice 184. The flow rate is further increased by the increased pressure attained by the mixture of gases at the time when the second orifice 186 is formed. The mixture of gases which has been pressurized upon burning of the combustible gas thus rushes quickly outward from the storage chamber 18 to inflate the air bag 12.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus for use in inflating an air bag, said apparatus comprising:

a container containing a supply of inflation fluid, said container having a first outer surface and an inner surface which is at least in part threaded and defines a threaded opening extending into said container from said first outer surface;

a plug having an outer periphery which is at least in part threaded, said plug being screwed into said threaded opening in said container, said outer periphery of said plug including a second outer surface adjacent said first outer surface of said container;

said outer periphery of said plug and said inner surface of said container defining said threaded opening comprising an interface between said plug and said container, said interface extending to the periphery of said container between said first and second outer surfaces; and means for blocking leakage of inflation fluid from said container through said interface, said blocking means including (i) a preformed continuous ring of uniform thickness having a flat annular surface overlying said interface and overlying portions of said first and second outer surfaces and (ii) means for securing said ring to said first and second outer surfaces.

2. An apparatus according to claim 1 wherein said securing means comprises a continuous ring of material extending around the periphery of said plug.

3. An apparatus according to claim 1 wherein said container defines a chamber for holding pressurized inflation fluid, said container having an end at which said first outer surface is located.

4. An apparatus according to claim 3 wherein said plug includes a flange which extends radially outward of said threaded outer periphery part of said plug and said second outer surface comprises a surface of said flange.

5. An apparatus according to claim 4 wherein said flange includes a surface which abuts against said inner surface of said container.

6. An apparatus according to claim 3 wherein said plug includes a closure located to block inflation fluid flow from said chamber to the air bag, said closure including a predefined break away portion which, when broken away, enables inflation fluid flow from said chamber to the air bag.

7. An apparatus according to claim 1 wherein said plug includes means defining a passage through which pressurized inflation fluid flows to fill said container with the pressurized inflation fluid.

8. An apparatus according to claim 1 wherein said ring and said securing means provide a hermetic seal between said container and said plug.

9. A method of manufacturing an apparatus for use in inflating an air bag, the method comprising the steps of:

providing a container having a first outer surface and an internally threaded opening extending into the container from the first outer surface;

screwing a plug having an outer periphery which is at least in part threaded into the internally threaded opening in the container, the outer periphery of the plug including a second outer surface, the screwing of the plug into the internally threaded opening in the container creating an interface between the plug and the container, the interface extending to the periphery of the container between the first and second outer surfaces;

positioning a preformed continuous ring of uniform thickness having a flat annular surface overlying the interface and overlying portions of the first and second outer surfaces; and securing the ring to the first and second outer surfaces to block leakage of inflation fluid from the container through the interface.

10. A method according to claim 9 wherein the step of securing the ring includes the step of establishing a hermetic seal between the container and the plug.

11. An apparatus for use in inflating an air bag, said apparatus comprising:

a container containing a supply of inflation fluid, said container having a first outer surface and an inner surface which is at least in part threaded and defines a threaded opening extending into said container from said first outer surface;

a plug having an outer periphery which is at least in part threaded, said plug being screwed into said threaded opening in said container, said outer periphery of said plug including a second outer surface adjacent said first outer surface of said container;

said outer periphery of said plug and said inner surface of said container defining said threaded opening comprising an interface between said plug and said container, said interface extending to the periphery of said container between said first and second outer surfaces; and means for blocking leakage of inflation fluid from said container through said interface, said blocking means including (i) a ring overlying said interface and overlying portions of said first and second outer surfaces and (ii) means for securing said ring to said first and second outer surfaces comprising a continuous ring of material extending around the periphery of said plug; and said continuous ring of material extending around the periphery of said plug being a friction weld between said ring and said first and second outer surfaces.

12. An apparatus according to claim 11 wherein said container defines a chamber for holding pressurized inflation fluid, said container having an end at which said first outer surface is located.

13. An apparatus according to claim 12 wherein said plug includes a flange which extends radially outward of said threaded outer periphery part of said plug and said second outer surface comprises a surface of said flange.

14. An apparatus according to claim 13 wherein said flange includes a surface which abuts against said inner surface of said container.

15. An apparatus according to claim 12 wherein said plug includes a closure located to block inflation fluid flow from said chamber to the air bag, said closure including a predefined break away portion which, when broken away, enables inflation fluid flow from said chamber to the air bag.

16. An apparatus according to claim 11 wherein said plug includes means defining a passage through which pressurized inflation fluid flows to fill said container with the pressurized inflation fluid.

17. An apparatus according to claim 11 wherein said ring and said securing means provide a hermetic seal between said container and said plug.

18. A method of manufacturing an apparatus for use in inflating an air bag, the method comprising the steps of:

providing a container having a first outer surface and an internally threaded opening extending into the container from the first outer surface;

screwing a plug having an outer periphery which is at least in part threaded into the internally threaded opening in the container, the outer periphery of the plug including a second outer surface, the screwing of the plug into the internally threaded opening in the container creating an interface between the plug and the container, the interface extending to the periphery of the container between the first and second outer surfaces;

positioning a ring overlying the interface and overlying portions of the first and second outer surfaces;

securing the ring to the first and second outer surfaces to block leakage of inflation fluid from the container through the interface; and wherein the step of securing the ring includes the step of friction welding the ring to the first and second outer surfaces.

19. A method according to claim 18 wherein the step of securing the ring includes the step of establishing a hermetic seal between the container and the plug.

20. An apparatus as set forth in claim 1 wherein said container, said plug and said continuous ring are all comprised of the same material.

21. An apparatus as set forth in claim 20 wherein said material comprises aluminum.

* * * * *